United States Patent [19]

Morin

[11] Patent Number: 5,131,374
[45] Date of Patent: Jul. 21, 1992

[54] INJECTION HYDRAULIC AUTOMATIC ADVANCE DEVICE

[75] Inventor: Rene Morin, Saint-Pierre-De-Boeuf, France

[73] Assignee: Renault Vehicules Industriels, Lyon, France

[21] Appl. No.: 678,457

[22] Filed: Apr. 1, 1991

[30] Foreign Application Priority Data

Apr. 2, 1990 [FR] France .................. 90 04196

[51] Int. Cl.$^5$ .................. F02M 59/20; F02D 5/00
[52] U.S. Cl. .................. 123/502; 123/179.17; 464/2
[58] Field of Search .................. 123/502, 501, 500; 464/2, 5

[56] References Cited

U.S. PATENT DOCUMENTS

| | | | |
|---|---|---|---|
| 2,910,975 | 11/1959 | Evans | 123/502 |
| 4,132,202 | 1/1979 | Nakayama | 123/501 |
| 4,250,859 | 2/1981 | Scheying | 123/501 |
| 4,401,088 | 8/1983 | Morin | 123/502 |
| 4,489,698 | 12/1984 | Hofer | 123/179 L |
| 4,491,116 | 1/1985 | Morin | 123/502 |
| 4,509,490 | 4/1985 | Morin | 123/502 |
| 4,557,240 | 12/1985 | Sakaranaka | 123/179 L |

FOREIGN PATENT DOCUMENTS 0049029  3/1982  Japan .................. 123/502

Primary Examiner—Carl S. Miller
Attorney, Agent, or Firm—Oblon, Spivak, McClelland, Maier & Neustadt

[57] ABSTRACT

A hub 1 integral with the injection pump to include a housing 2 driven in rotation, surrounding hub 1 and including two rollers 4, 5 placed parallel to the axis of the housing at a distance from this axis. An eccentric governor weight 15 is mounted on hub 1 to be able to move in one direction under the action of the centrifugal force. Two advance control pistons 8, 9 with axis orthogonal to the axes of the hub are mounted in the hub, each to be able to slide in a recessed bore and each equipped with a lateral support ramp 10, 11 able to work with one of the rollers 4, 5 to cause an angular offset between hub 1 and housing 2. One of the pistons 8 acts in the other direction on governor weight 15 by a spring 18. A hydraulic circuit goes through the hub and has a distributor with controlled relief 20 adjusting the pressure acting on pistons 8, 9 as a function of the position of governor weight 15. An additional piston 32 modifies the position of balance of governor weight 15 as a function of the pressure prevailing in the hydraulic circuit. A correction device acting as a function of the temperature of the hydraulic fluid can also be provided.

5 Claims, 4 Drawing Sheets ically. The various embodiments can also be combined with variants making it possible, for example, to replace a spring acting on the governor weight by a pneumatic spring.

INJECTION HYDRAULIC AUTOMATIC ADVANCE DEVICE

BACKGROUND OF THE INVENTION

This invention has as its object an automatic advance device controlled hydraulically for a fuel injection system, in particular for a diesel engine injection pump.

It is known that in a diesel engine, in particular a large engine equipping a commercial vehicle, it is essential to introduce, in the kinematic chain of movement terminating at the shaft of the injection pump, a variable angular offset, taking into account instantaneous operating conditions of the engine. Automatic mechanical devices for adjustment of injection advance are known which, however, poorly withstand high driving stresses.

A hydraulic automatic device for advance adjustment is also known, in particular by French Pat. No. 2 445 440, for a diesel engine injection pump able to be fitted directly on the engine by a flange, the advance device able to be housed actually inside the distributor housing of the diesel engine. As it is described in this prior patent, the advance device comprises a hub integral with the injection pump, a housing surrounding the hub and comprising two rollers. An eccentric governor weight is mounted on the hub to be able to oscillate under the action of the centrifugal force. Two advance control pistons cooperate with the rollers to cause an angular offset between the hub and the housing. One of the pistons acts on the governor weight by a spring. The internal pressure of the device is adjusted automatically by a distributor with controlled relief.

In such a device, the injection advance is automatically controlled by the speed of rotation of the device, the centrifugal force acting on the governor weight taking a position of balance resulting from the centrifugal force acting on the governor weight and the tension of the spring. The oil pressure acting on the pistons is adjusted by the distributor controlled by the governor weight. In this hydraulic automatic device for injection advance of known type, an angular offset depending only on the speed of rotation is obtained.

It is necessary, however, to make other operating parameters of the engine and in particular the charge of the injection pump and/or the temperature of the hydraulic fluid intervene in the adjustment. The charge of the injection pump constitutes an operating parameter on which depends the pressure of the hydraulic fluid, which is directly proportional to the torque to be transmitted.

SUMMARY OF THE INVENTION

This invention therefore has as an object a hydraulic automatic advance device for injection comprising correction means able to take into account additional parameters that constitute the charge of the injection pump and/or the temperature of the hydraulic fluid.

The injection hydraulic automatic advance device, in particular for a diesel engine injection pump, according to the invention, comprises: a hub integral with the injection pump; a housing driven in rotation surrounding the hub and comprising two rollers placed parallel to the axis of the housing at a distance from this axis; an eccentric governor weight mounted on the hub to be able to move in one direction under the action of the centrifugal force. Two advance control pistons with axis orthogonal to the axis of the hub are mounted in the hub each to be able to slide in a recessed bore. Each piston is equipped with a lateral support ramp able to work with one of the rollers of the housing to cause an angular offset between the hub and the housing. One of the advance control pistons acts on the governor weight by a spring. This action is exerted in the other direction relative to the action of the centrifugal force. A hydraulic circuit goes through the hub and comprises a distributor with controlled escape adjusting the pressure acting on the pistons as a function of the position of the governor weight. The device further comprises means for modifying the position of balance of the governor weight as a function of the pressure prevailing in the hydraulic circuit.

According to a first embodiment of the invention, the device comprises means for modifying the tension of the spring mounted between the governor weight and the advance control piston.

An additional piston can, for example, be mounted in the advance control piston and be used for support to the spring, said additional piston being subjected to the pressure prevailing in the hydraulic circuit. In this way, the tension of the spring increases when the pressure increases in the hydraulic circuit. An advance correction is obtained whose offset amplitude decreases with the increase of the oil pressure in the hydraulic circuit, i.e. with the increase of the torque to be transmitted, itself proportional to the charge of the injection pump. The offset therefore decreases when the charge of the injection pump increases.

In another embodiment, the device comprises an advance correction piston mounted in the hub, subjected to the pressure prevailing in the hydraulic circuit and acting directly on the governor weight. The advance correction piston is advantageously placed to act on the governor weight in the same direction as the centrifugal force, i.e., opposite to the action exerted by the spring. A variable force as a function of the pressure prevailing in the hydraulic circuit therefore comes to be added to the centrifugal force applied to the governor weight, modifying the balance of the latter. Finally, an advance correction is obtained whose offset amplitude increases with the increase of the torque to be transmitted and therefore with the increase of the charge of the injection pump.

In a third embodiment of the invention, the device comprises a stopper controlled by a temperature-sensitive element mounted in the hydraulic circuit either upstream or downstream from the distributor controlled by the governor weight.

The stopper can comprise a piston equipped with a return spring and subjected to the action of the heat-sensitive element, the unit being mounted in the hub parallel to the axis of said hub to prevent the centrifugal force from having an effect on the movement of the stopper.

The temperature-sensitive element is preferably placed so that a temperature increase of the hydraulic fluid causes the movement of the stopper in the direction of the opening. In this way, when the temperature rises and becomes greater than a set value, the fluid can escape causing a drop in pressure in the hydraulic circuit thus causing a reduction of the angular offset.

The various embodiments which have just been mentioned can each be used independently. It can also be considered to combine them with one another either two by two or all three simultaneously to obtain each time, as a function of the particular use desired, an advance correction depending on one or more of the parameters that constitute the charge of the injection pump and the temperature of the hydraulic fluid.

BRIEF DESCRIPTION OF THE DRAWINGS

The invention will be understood better from the study of several embodiments described by way of examples not at all limiting and illustrated by the accompanying drawings in which.

DETAILED DESCRIPTION OF THE PREFERRED EMBODIMENTS

Figure 1:
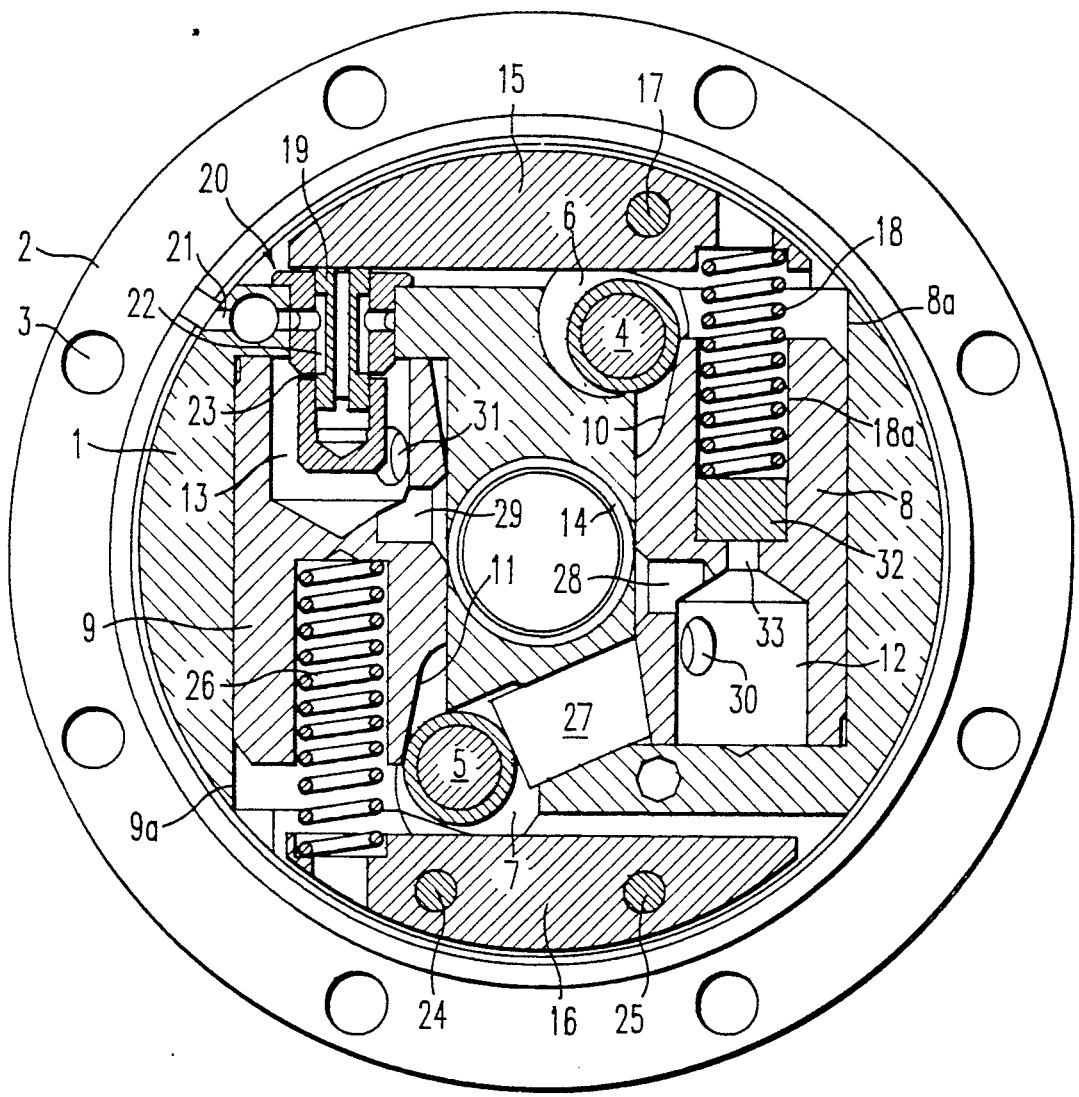
FIG. 1 is a view in section of a hydraulic automatic advance device according to the invention in a first embodiment.

As it is illustrated in FIG. 1, the device according to the invention consists of a rotating compact unit mainly comprising, on the one hand, a hub 1 integral with the camshaft, the injection pump not shown in the figure and constituting a driven part; and, on the other hand, a housing 2 driven in rotation therefore constituting a driving part surrounding hub 1 and able to be attached by holes 3 directly to a driving pinion not shown in the figure.

Inside, housing 2 has two rollers 4, 5, which are diametrically opposite, parallel to the axis of the device and located at a distance from this axis. Rollers 4, 5, which are in the form of portions of pins integral with housing 2, are housed inside cylindrical recesses 6, 7 of hub 1 to make possible a variation of the angular position of hub 1 relative to housing 2.

Rollers 4, 5 are respectively associated with advance control pistons 8, 9. Each piston 8, 9 is mounted to be able to slide in a recessed bore 8a, 9a of hub 2 and comprises a lateral support ramp 10, 11 which works with one of corresponding rollers 4, 5. Pressure chambers 12, 13 are delimited behind pistons 8, 9 and are in communication with an annular duct 14 in which a supply of pressurized fluid comes out by a rotating joint, not shown in the figure.

The device comprises two diametrically opposite governor weights 15 and 16, whose large axis is approximately perpendicular to the axes of pistons 8, 9. Governor weight 15 is mounted to pivot around a pin 17 and is subjected to the action of advance control piston 8 by a spring 18, which here is a helical compression spring placed along the axis of piston 8 in a bore 18a of the front part of the latter. It will be noted that swivel pin 17 is parallel to the axis of hub 1. Spring 18 acts on one of the ends of governor weight from one side of swivel pin 17. The other end of governor weight 15 comes to act on a slide valve 19 of a distributor with controlled escape referenced 20 as a whole, mounted between pressure chamber 13 located behind piston 9 and a duct 21 by which the hydraulic fluid can be directed toward the outlet. Mobile valve 19 has lateral slots 22 on a part of its length to be able to clear a passage 23 for the hydraulic fluid passing from pressure chamber 13 toward output duct 21. The center of gravity of pivoting governor weight 15 is located between swivel pin 17 and the geometric axis of mobile valve 19.

Governor weight 16 is mounted in a way identical with pivoting governor weight 15. However, governor weight 16 is immobile, and it is attached by two pins 24, 25 to hub 1. A second helical compression spring 26, mounted in a recessed bore of the front part of piston 9, comes to rest on one of the ends of governor weight 16. The existence of second governor weight 16 makes it possible to eliminate any risk of unbalance during the rotation of the entire device. Taking into account the very low weight of valve 19 relative to the weight of pivoting governor weight 15, the centrifugal force acting on valve 19 is insignificant and is not to be taken into account in the operation of the device.

A stop part 27 mounted between roller 5 and piston 8 works with the latter by a lateral inclined ramp to slow down the return stroke of piston 8.

The hydraulic circuit inside hub 1 comprises radial passages 28, 29 as well as orifices 30 and 31 allowing the passage of the hydraulic fluid from pressure chamber 12 to pressure chamber 13 by passing through annular passage 14.

In the embodiment illustrated in FIG. 1, spring 18 rests, on the one hand, on mobile governor weight 15 and, on the other hand, on an additional support piston 32 housed inside bore 18a of advance control piston 8. A passage 33 puts pressure chamber 12 in communication with the rear face of additional piston 32 which therefore is thus subjected to the pressure prevailing in the hydraulic circuit.

The operation of the device is as follows. When the system is at rest, i.e. when the centrifugal forces still do not have any action on mobile governor weight 15, the latter is subjected only to the action of spring 18. Valve 19 is then pushed toward the inside and distributor 20 connects pressure chambers 12 and 13 to the outlet. Pistons 8 and 9 remain at rest. Starting from a certain speed of rotation, pivoting governor weight 15 pivots toward the outside under the effect of the centrifugal force and valve 19 moves toward the outside thus reducing the escape of hydraulic fluid toward the outlet which makes the pressure rise in chambers 12 and 13. Two pistons 8 and 9 then move forward, i.e. in the direction of two rollers 4 and 5, which has the effect, thanks to inclined ramps 10 and 11, of creating a certain angular offset between hub 1 and housing 2 and of increasing the compression of springs 18 and 26. Spring 18 opposes the centrifugal force by tending to bring the center of gravity of pivoting governor weight 15 back toward the inside.

Further, the pressure produced in pressure chamber 12 is applied directly to additional piston 32 which moves and increases the compression of spring 18, thus modifying the stress that it exerts on pivoting governor weight 15. The position of balance of pivoting governor weight 15 is therefore modified relative to the position that it would occupy in the absence of additional piston 32. The modified position of balance corresponds to a certain angular offset which is different from that which would have been obtained without the existence of additional piston 32. An advance correction whose offset amplitude decreases with the increase of the pressure, i.e. with the increase of the charge of the injection pump, is thus obtained.

Figure 2:
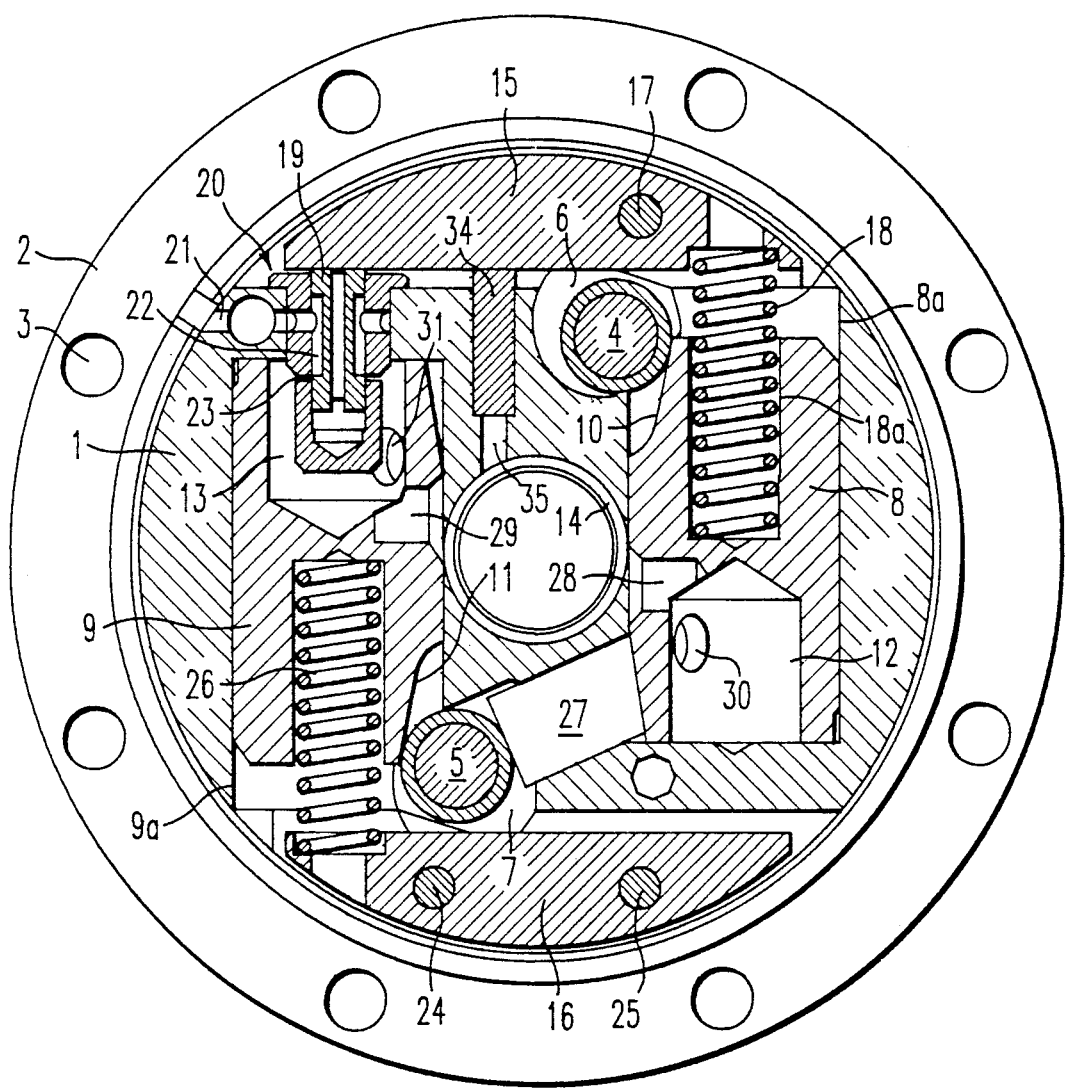
FIG. 2 is an analogous view in section of a second embodiment.

The second embodiment of the invention illustrated in FIG. 2, in which the identical parts bear the same references, differs from the preceding embodiment by the fact that the means of correction of the angular offset this time is no longer a modification of the tension of spring 18 but a direct action on pivoting governor weight 15. In this embodiment, actually, spring 18 rests on the recessed bottom of bore 18a made in the front part of advance control piston 8. An advance correction piston 34 is housed in an orifice made in hub 1 in a position which is opposite spring 18 relative to swivel pin 17. Advance correction piston 34 is subjected to the pressure prevailing in the hydraulic circuit by a passage 35 communicating with annular passage 14. Piston 34 rests directly on pivoting governor weight 15 and makes the latter pivot around swivel pin 17 in opposition to the action of spring 18, i.e. in the same direction as the centrifugal force, taking into account the position of piston 34 relative to swivel pin 17.

Under these conditions, the pressure prevailing inside the hydraulic circuit and being applied directly to advance correction piston 34 has the effect of adding a variable force as a function of the pressure to the centrifugal force being exerted on governor weight 15 during the rotation of the device. The position of balance of governor weight 15 thus is modified as a function of the pressure prevailing in the hydraulic circuit consequently causing a correction of the angular offset which would have been obtained in the absence of correction piston 34. An advance correction is obtained whose offset amplitude increases with the increase of the pressure of the hydraulic circuit, i.e. with the increase of the charge of the injection pump.

It is possible to combine the embodiments illustrated in FIGS. 1 and 2 by providing both a modification of the tension of spring 18 as illustrated in FIG. 1 and a direct action on governor weight 15 as illustrated in FIG. 2. The two actions can be modulated by varying respective passage orifices 33 and 35 according to the advance correction that is desired to obtain for each particular case.

Figure 3:
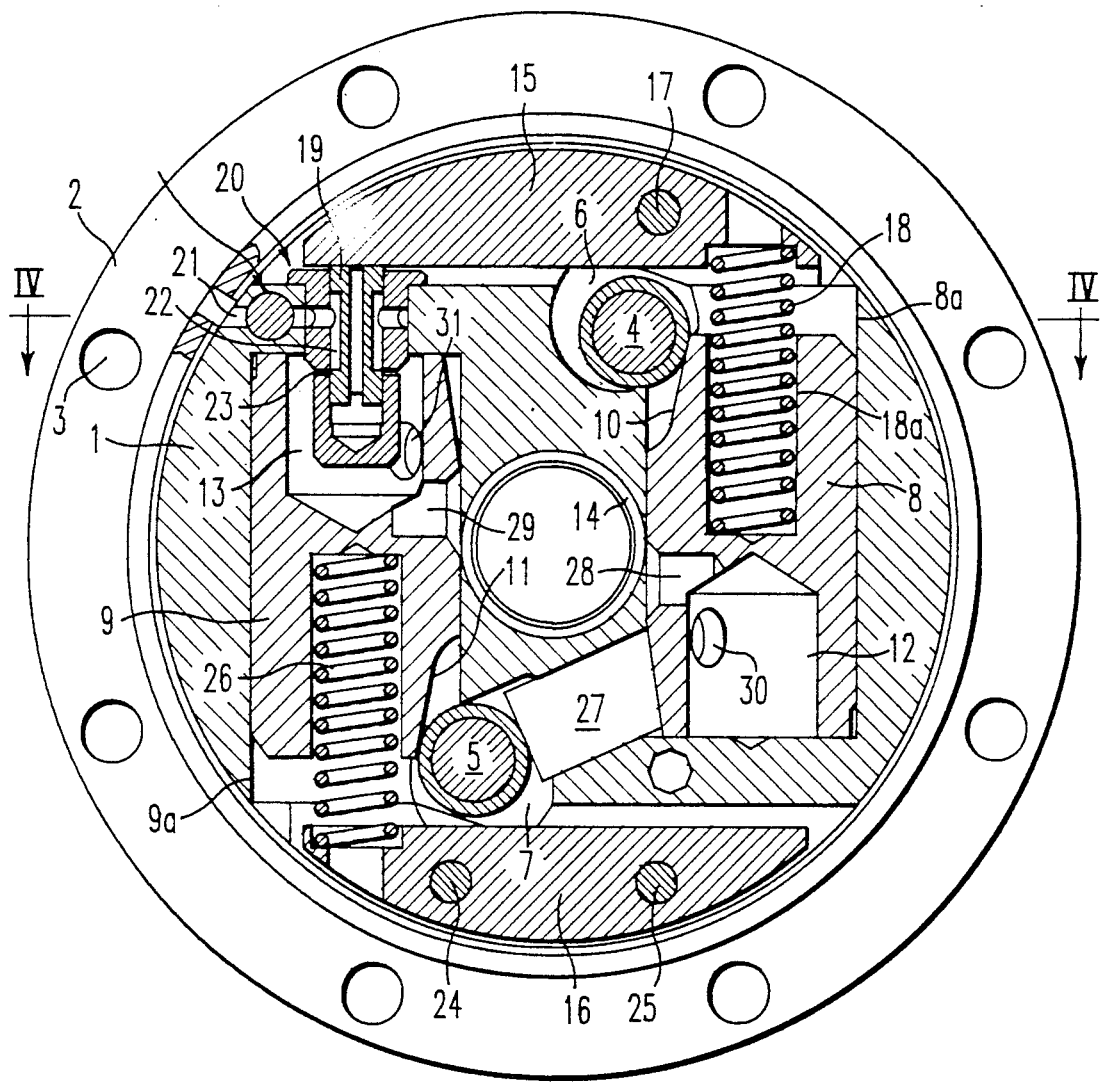
FIG. 3 is a view in section of a third embodiment.
Figure 4:
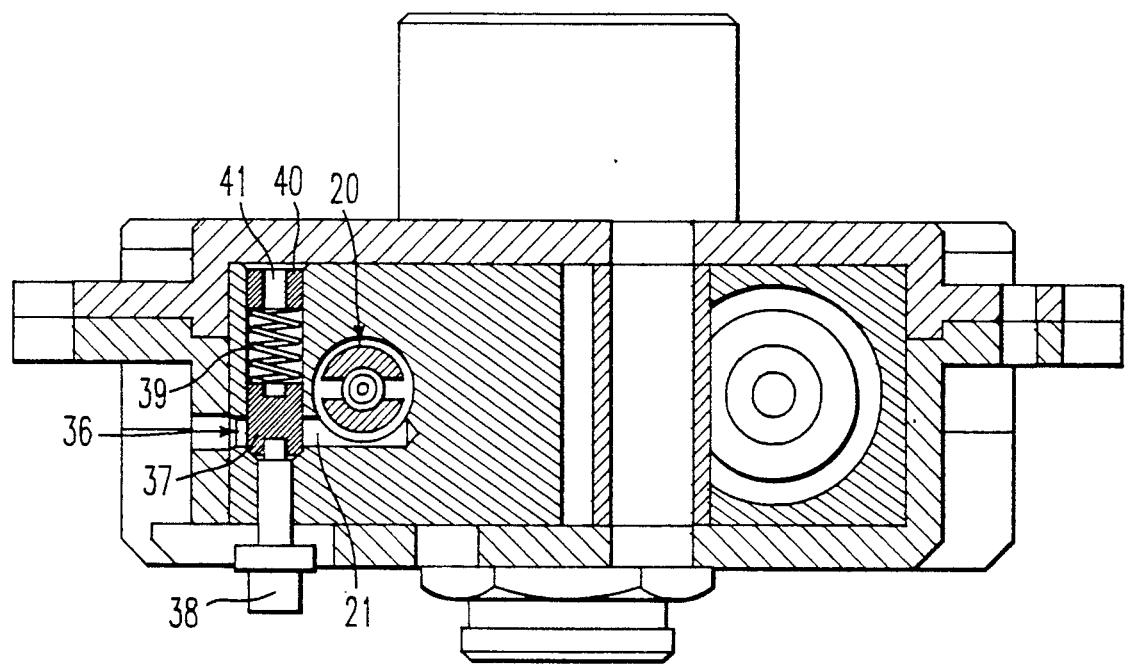
FIG. 4 is a view in section along IV—IV of FIG. 3.

In the embodiment illustrated in FIGS. 3 and 4 where the identical parts bear the same references, a stopper referenced in a general manner 36 is mounted in output duct 21, downstream from distributor 20. The stopper comprises a piston 37 (FIG. 4) placed parallel to the axis of the advance device. Piston 37 is subjected, on the one hand, to the action of a wax thermostatic element 38 and, on the other hand, to the action of a helical compression spring 39 resting on a stationary stop 40 so that spring 39 assures the return of piston 37 to its closing position when the temperature decreases. When the temperature increases, piston 37 is moved to clear output passage 21. It will be noted that the space between piston 37 and stationary stop 40 communicates with the atmosphere by axial hole 41 made in stop 40. Moreover, piston 37 is placed in hub 1 in a crosswise way, i.e. parallel to the axis of said hub so that its movement is not disturbed by the centrifugal force.

The device operates in the following way: when the temperature is less than a set temperature of thermostatic element 38, piston 37 completely blocks output orifice 21 so that the hydraulic fluid cannot escape from the hydraulic circuit of the automatic advance device. The hydraulic circuit being supplied continuously by a pressurized fluid, a maximum pressure is produced in the automatic advance device thus causing a maximum angular offset by action of two advance control pistons 8, 9 working with two rollers 4, 5. The advance is therefore at a maximum for the cold start-up of the engine equipped with such a device.

When the temperature of the hydraulic fluid rises and becomes higher than the set temperature of thermostatic element 38, the latter pushes back piston 37 by compressing spring 39. Output passage 21 is cleared, which causes a reduction of the pressure inside the automatic advance device. The pressure is then adjusted by the calibration and the escape of the hydraulic fluid through lateral slots 22 of mobile valve 19, i.e. as a function of the speed and according to the centrifugal force exerted on governor weight 15 which takes a position of balance also depending on the action of spring 18.

The device would operate in the same way if stopper 36 were placed upstream from distributor 20.

The embodiment illustrated in FIG. 3, in which the correction is made by the action of the temperature, can be combined with any of the embodiments illustrated in FIG. 1 and 2 where the correction depends, on the contrary, on the pressure prevailing in the hydraulic circuit, i.e. the charge of the injection pump.

All the embodiments can also be combined to obtain the simultaneous action of the two parameters as a function of the desired application.

I claim:

1. Injection hydraulic automatic advance device for a diesel engine injection pump, comprising:
   a hub integral with the injection pump;
   a housing driven in rotation and surrounding said hub;
   two rollers in said housing and extending parallel to, and a distance from, the axis of the housing;
   an eccentric governor weight mounted on the hub so as to be able to move in one direction under the action of centrifugal force;
   two advance control pistons with axes orthogonal to the axis of the hub and mounted in said hub so as to be able to slide in a recessed bore, each said piston including a lateral support ramp engageable with one of said rollers to cause an angular offset between said hub and said housing, one of said pistons acting in opposition to said governor weight via a spring;
   a hydraulic circuit going through the hub and comprising a distributor with controlled relief for adjusting the pressure acting on said pistons as a function of the position of said governor weight; and
   means for modifying the position of balance of said governor weight as a function of the pressure prevailing in the hydraulic circuit,
   wherein said modifying means comprises an advance correction piston mounted in said hub and subjected to the pressure prevailing in the hydraulic circuit, said advance correction piston acting directly on said governor weight.

2. Device according to claim 1, wherein said advance correction piston is placed to act on the governor weight in the same direction as the centrifugal force.

3. Device according to claim 1, including a hydraulic circuit relief stopper and a temperature-sensitive element mounted in the hydraulic circuit so as to control said stopper.

4. Device according to claim 3, wherein the temperature-sensitive element is placed so that a temperature increase causes the movement of the stopper in a direction to increase relief of said hydraulic circuit.

5. Device according to claim 3, wherein said stopper comprises a unit of a piston equipped with a return spring and subjected to the action of said temperature-sensitive element, the unit being mounted in the hub parallel to the axis of said hub.

* * * * *